(12) United States Patent
Kim et al.

(10) Patent No.: US 11,541,721 B2
(45) Date of Patent: Jan. 3, 2023

(54) VEHICULAR HEAT MANAGEMENT SYSTEM

(71) Applicant: Hanon Systems, Daejeon (KR)

(72) Inventors: Doo Hoon Kim, Daejeon (KR); Hyeon Gyu Kim, Daejeon (KR); Kyung Ju An, Daejeon (KR); Joong Man Han, Daejeon (KR)

(73) Assignee: Hanon Systems, Daejeon (KR)

( * ) Notice: Subject to any disclaimer, the term of this patent is extended or adjusted under 35 U.S.C. 154(b) by 148 days.

(21) Appl. No.: 16/385,050

(22) Filed: Apr. 16, 2019

(65) Prior Publication Data

US 2019/0315194 A1 Oct. 17, 2019

(30) Foreign Application Priority Data

Apr. 17, 2018 (KR) .......................... 10-2018-0044329

(51) Int. Cl.
| | |
|---|---|
| *B60H 1/03* | (2006.01) |
| *B60H 1/00* | (2006.01) |
| *B60H 1/04* | (2006.01) |
| *B60H 1/22* | (2006.01) |

(52) U.S. Cl.
CPC .......... *B60H 1/03* (2013.01); *B60H 1/00278* (2013.01); *B60H 1/00342* (2013.01); *B60H 1/00385* (2013.01); *B60H 1/00735* (2013.01); *B60H 1/00885* (2013.01); *B60H 1/00907* (2013.01); *B60H 1/04* (2013.01); *B60H 2001/00928* (2013.01); *B60H 2001/2253* (2013.01); *B60H 2001/2265* (2013.01); *B60H 2001/2287* (2013.01)

(58) Field of Classification Search
CPC .................. B60H 1/03; B60H 1/00278; B60H 1/00342; B60H 1/00385; B60H 1/00735; B60H 1/00885; B60H 1/00907; B60H 1/04; B60H 2001/00928; B60H 2001/2253; B60H 2001/2265; B60H 2001/2287

See application file for complete search history.

(56) References Cited

U.S. PATENT DOCUMENTS

| | | | | |
|---|---|---|---|---|
| 5,322,217 A | * | 6/1994 | Brocx ................ | B60H 1/00485 137/115.06 |
| 6,047,770 A | * | 4/2000 | Suzuki .................... | B60L 1/003 165/202 |
| 7,716,934 B2 | * | 5/2010 | Ebara ..................... | B60H 1/143 62/113 |

(Continued)

*Primary Examiner* — Travis Ruby
(74) *Attorney, Agent, or Firm* — Norton Rose Fulbright US LLP; James R. Crawford

(57) ABSTRACT

A vehicular heat management system includes a refrigerant circulation line configured to cool or heat a passenger compartment by generating a hot air or a cold air depending on a flow direction of a refrigerant, a cooling water circulation line configured to heat the passenger compartment with waste heat of an engine by allowing cooling water of the engine to circulate through a heater core, a refrigerant-cooling water heat exchanger disposed in the cooling water circulation line to allow the refrigerant and the cooling water to exchange heat, and an engine cooling water independent circulation unit configured to allow the cooling water passed through the engine to bypass the heater core and the refrigerant-cooling water heat exchanger.

8 Claims, 6 Drawing Sheets

(56) References Cited

U.S. PATENT DOCUMENTS

| | | | |
|---|---|---|---|
| 8,740,103 B2* | 6/2014 | Major | B60H 1/00792 |
| | | | 237/12.3 B |
| 9,821,630 B2* | 11/2017 | Goenka | F25D 16/00 |
| 10,040,334 B2* | 8/2018 | Graaf | B60H 1/00899 |
| 10,076,946 B2* | 9/2018 | Kang | B60H 1/00899 |
| 10,589,594 B2* | 3/2020 | Heyl | B60L 1/003 |
| 10,875,385 B2* | 12/2020 | Durrani | B60H 1/00921 |
| 2001/0048031 A1* | 12/2001 | Noro | F25B 30/02 |
| | | | 237/2 B |
| 2002/0005268 A1* | 1/2002 | Noda | B60H 1/00878 |
| | | | 165/42 |
| 2003/0177778 A1* | 9/2003 | Hesse | B60H 1/3204 |
| | | | 62/324.1 |
| 2004/0060316 A1* | 4/2004 | Ito | F25B 13/00 |
| | | | 62/324.1 |
| 2004/0194949 A1* | 10/2004 | Ban | B60L 1/02 |
| | | | 165/287 |
| 2006/0080985 A1* | 4/2006 | Inaba | B60H 1/00907 |
| | | | 62/238.6 |
| 2006/0081355 A1* | 4/2006 | Horstmann | B60H 1/08 |
| | | | 165/43 |
| 2008/0196877 A1* | 8/2008 | Zeigler | F25B 13/00 |
| | | | 165/202 |
| 2008/0202722 A1* | 8/2008 | Feuerecker | F25B 13/00 |
| | | | 165/41 |
| 2009/0205353 A1* | 8/2009 | Takahashi | B60H 1/00899 |
| | | | 62/324.1 |
| 2010/0281901 A1* | 11/2010 | Kawase | F25B 25/005 |
| | | | 62/238.7 |
| 2011/0174000 A1* | 7/2011 | Richter | B60H 1/00921 |
| | | | 62/93 |
| 2011/0232890 A9* | 9/2011 | Gering | B60K 11/02 |
| | | | 165/202 |
| 2012/0174602 A1* | 7/2012 | Olivier | B60H 1/005 |
| | | | 62/79 |
| 2012/0204596 A1* | 8/2012 | Takenaka | F25B 13/00 |
| | | | 62/510 |
| 2014/0075972 A1* | 3/2014 | Heyl | B60H 1/00899 |
| | | | 62/115 |
| 2015/0174986 A1* | 6/2015 | Satzger | B60H 1/00921 |
| | | | 165/41 |
| 2015/0276281 A1* | 10/2015 | Satzger | F25B 30/02 |
| | | | 62/115 |
| 2015/0298522 A1* | 10/2015 | Hirabayashi | B60H 1/00314 |
| | | | 701/36 |
| 2015/0330351 A1* | 11/2015 | Ragazzi | F02N 19/10 |
| | | | 123/552 |
| 2016/0107508 A1* | 4/2016 | Johnston | H01M 10/663 |
| | | | 165/202 |
| 2016/0221413 A1* | 8/2016 | Gebbie | B60H 1/00278 |
| 2017/0054188 A1* | 2/2017 | Blatchley | H01M 10/663 |
| 2017/0174038 A1* | 6/2017 | Scheldel | B60H 1/32284 |
| 2018/0029440 A1* | 2/2018 | Cheng | H01M 10/615 |
| 2018/0272839 A1* | 9/2018 | Kato | B60H 1/08 |

* cited by examiner

VEHICULAR HEAT MANAGEMENT SYSTEM

CROSS-REFERENCE TO RELATED PATENT APPLICATIONS

This application claims the benefit of Korean Patent Application No. 10-2018-0044329 dated Apr. 17, 2018. The disclosure of the above patent application is hereby incorporated herein by reference in their entirety.

TECHNICAL FIELD

The present invention relates to a vehicular heat management system and, more particularly, to a vehicular heat management system capable of minimizing the energy consumption and enhancing the passenger compartment heating efficiency by using engine cooling water and a heat pump as heat sources for heating a passenger compartment and improving the control method and use timing thereof.

BACKGROUND ART

A hybrid vehicle is a vehicle that uses an electric motor and an internal combustion engine in combination. When the hybrid vehicle is running at a high load, for example, when the hybrid vehicle is running at a high speed or on an uphill, the hybrid vehicle comes into an engine driven mode in which an engine is used.

Conversely, the hybrid vehicle is running at a low load, for example, when the hybrid vehicle is running at a low speed or stopped, the hybrid vehicle comes into a motor driven mode in which an electric motor is used.

Such a hybrid vehicle (hereinafter generally referred to as "vehicle") is equipped with an air conditioner for cooling and heating a passenger compartment.

As shown in FIG. 1, the air conditioner is provided with a compressor 1, a condenser 3, an expansion valve 5, an evaporator 6 and a heater core 7. In a cooling mode, the refrigerant of the compressor 1 is circulated through the condenser 3, the expansion valve 5 and the evaporator 6 to generate a cold air in the evaporator 6. The cold air thus generated is supplied into the passenger compartment to cool the passenger compartment.

In a heating mode, the cooling water for an engine 8 is circulated through the heater core 7 to transfer the waste heat of the engine 8 to the heater core 7 to generate a hot air. The hot air thus generated is supplied into the passenger compartment to heat the passenger compartment.

Meanwhile, the air conditioner may often come into the heating mode while the vehicle is operated in the motor driven mode. In this case, the motor driven mode is converted into an engine driven mode to re-operate the engine 8.

Thus, the passenger compartment can be heated using the waste heat generated from the engine 8. This makes it possible to enhance the passenger compartment heating performance.

However, in such a conventional air conditioner, there may be a case where the entry and release of the heating mode are frequently generated in the motor driven mode. In this case, the engine 8 needs to be frequently turned on and off. Thus, the power consumption is increased and the temperature of the air blown into the passenger compartment is changed, resulting in a problem that the comfort of the passenger compartment is deteriorated.

Particularly, since the engine 8 is frequently turned on and off, the energy consumption is rapidly increased, which causes a drawback that the fuel efficiency of the vehicle is remarkably lowered.

In view of this, the air conditioner may be improved into a heat pump type (not shown) so that, in the cooling mode, the passenger compartment can be heated without re-operating the engine 8, thereby improving the fuel efficiency of the vehicle.

However, the heat pump type air conditioner has a drawback in that the heat generation efficiency thereof is low and the air having a high temperature cannot be supplied into the passenger compartment. Thus, there is a problem that the passenger compartment heating performance is deteriorated.

Particularly, when the air temperature is very low, for example, when the ambient air temperature is −5 degrees C. or less, it is not possible to supply air having a temperature high enough to heat the passenger compartment. Thus, there is a problem that the passenger compartment heating efficiency is deteriorated and the comfort in the passenger compartment is lowered.

In view of this, an electric heater 9 using electricity may be additionally installed to heat the air supplied into the passenger compartment, thereby enhancing the passenger compartment heating performance.

However, when the electric heater 9 is used, the power consumption of a battery (not shown) is increased, and the fuel efficiency of the vehicle is further reduced.

SUMMARY

In view of the aforementioned problems inherent in the related art, it is an object of the present invention to provide a vehicular heat management system capable of minimizing the energy consumption and enhancing the passenger compartment heating efficiency by using engine cooling water and a heat pump as heat sources for heating a passenger compartment and improving the control method and use timing thereof.

Another object of the present invention is to provide a vehicular heat management system capable of improving the fuel efficiency of a vehicle and enhancing the comfort in a passenger compartment by improving the control method and use timing of engine cooling water and a heat pump so as to minimize the energy consumption and enhance the passenger compartment heating efficiency.

According to one aspect of the present invention, there is provided a vehicular heat management system, including: a refrigerant circulation line configured to cool or heat a passenger compartment by generating hot air or cold air depending on a flow direction of a refrigerant; a cooling water circulation line configured to heat the passenger compartment with waste heat of an engine by allowing cooling water of the engine to circulate through a heater core; a refrigerant-cooling water heat exchanger disposed in the cooling water circulation line to allow the refrigerant and the cooling water to exchange heat; and an engine cooling water independent circulation unit configured to allow the cooling water passed through the engine to bypass the heater core and the refrigerant-cooling water heat exchanger.

In the system, the engine cooling water independent circulation unit may include a bypass line configured to allow the cooling water on an outlet side of the engine to flow toward an inlet side of the engine.

In the system, the refrigerant-cooling water heat exchanger and the engine may be parallel-connected to the heater core, and the bypass line may be configured to connect the outlet side and the inlet side of the engine in a portion of the cooling water circulation line between the refrigerant-cooling water heat exchanger and the engine.

In the system, the bypass line may be connected at one end to a portion of the cooling water circulation line between an outlet of the engine and a branching point of the refrigerant-cooling water heat exchanger and connected at the other end to a portion of the cooling water circulation line between an inlet of the engine and the branching point of the refrigerant-cooling water heat exchanger to form a cooling water circulation loop for allowing the cooling water on the outlet side of the engine to directly circulate toward the inlet side of the engine.

In the system, the cooling water circulation loop formed between the engine and the bypass line may be included in a cooling water circulation loop formed between the engine and the heater core, so that when the cooling water of the engine circulates toward the heater core, the cooling water existing between the engine and the bypass line is introduced into the cooling water circulation loop formed between the engine and the heater core.

According to the vehicular heat management system of the present invention, in the passenger compartment heating mode, the waste heat of the engine and the heat of the heat pump side refrigerant circulation line are used as passenger compartment heating heat sources. One of the waste heat of the engine and the heat of the heat pump side refrigerant circulation line is selected and used as a passenger compartment heating heat source depending on the mode state and the heating mode of the vehicle. Accordingly, it is possible to minimize the energy consumption and enhance the passenger compartment heating efficiency.

Particularly, one of the waste heat of the engine and the heat of the heat pump side refrigerant circulation line, whichever is higher in thermal efficiency, is preferentially used as a heat source as long as it does not deteriorate the passenger compartment heating effect. Therefore, it is possible to enhance the passenger compartment heating efficiency while minimizing the energy consumption.

In addition, since the passenger compartment heating efficiency can be enhanced while minimizing the energy consumption, it is possible to improve the fuel efficiency of the vehicle and improve the comfort in the passenger compartment.

DETAILED DESCRIPTION

A preferred embodiment of a vehicular heat management system according to the present invention will now be described in detail with reference to the accompanying drawings.

Figure 1:
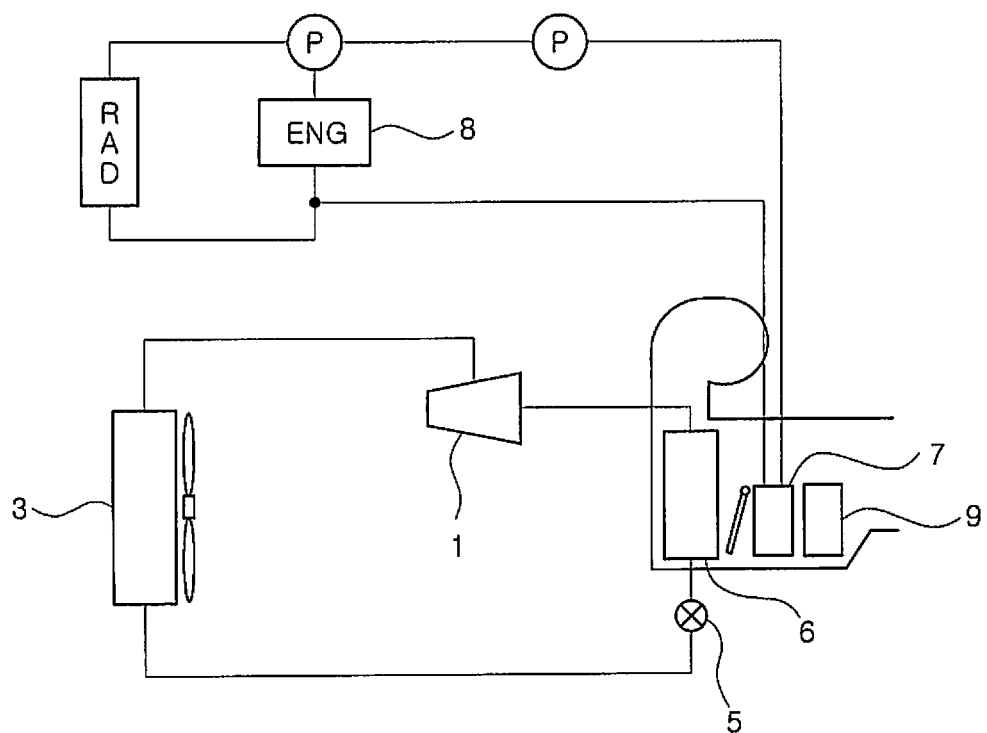
FIG. 1 is a view showing a conventional vehicular air conditioner.
Figure 2:
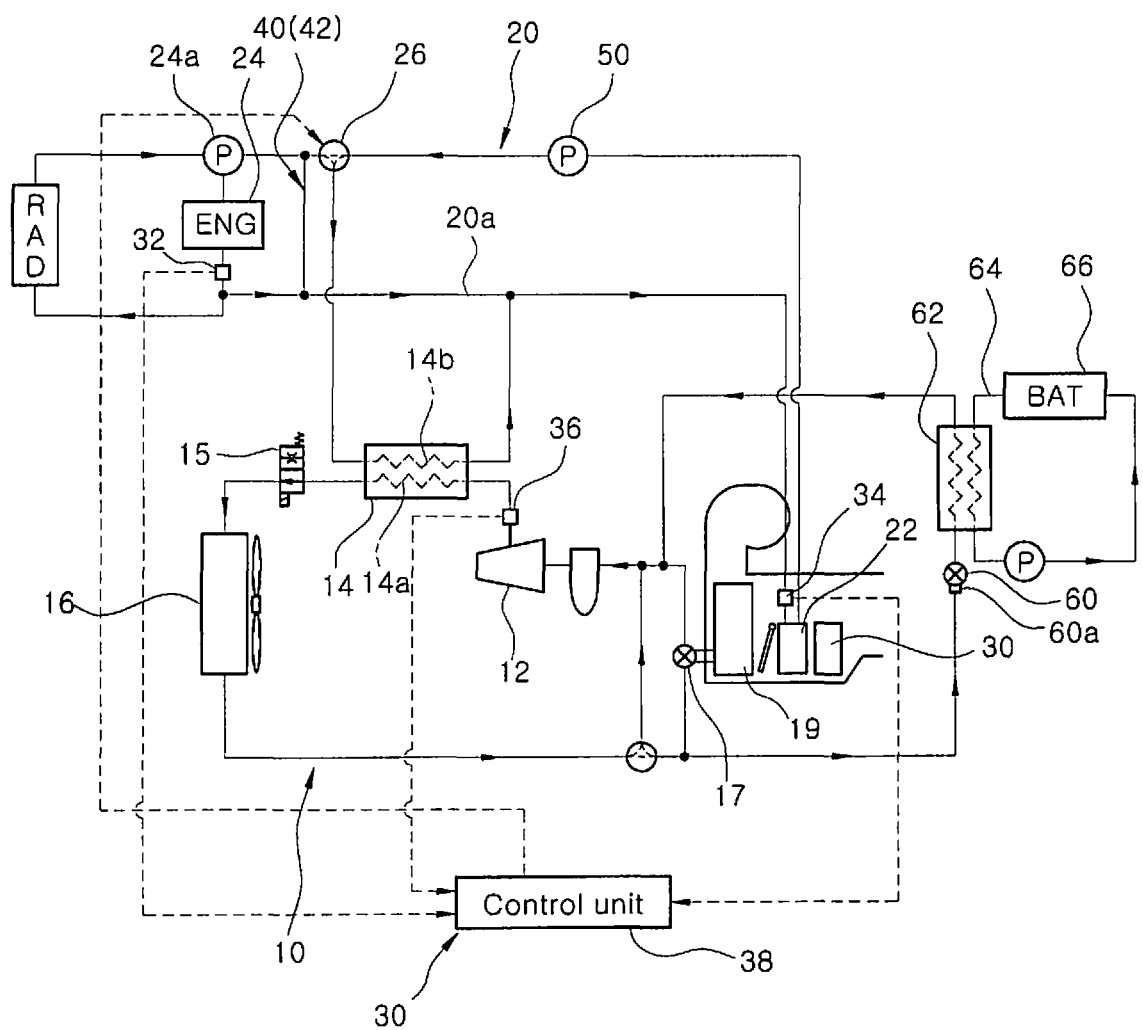
FIG. 2 is a detailed view showing a configuration of a vehicular heat management system according to the present invention.

Referring first to FIG. 2, the heat management system according to the present invention includes an air conditioner. The air conditioner is of a heat pump type and includes a heat pump side refrigerant circulation line 10 and a heater core side cooling water circulation line 20.

The heat pump side refrigerant circulation line 10 includes a compressor 12, a refrigerant-cooling water heat exchanger 14, a heat pump mode expansion valve 15, an outdoor heat exchanger 16, an air conditioner mode expansion valve 17 and an indoor heat exchanger 19.

During a passenger compartment cooling mode, the heat pump side refrigerant circulation line 10 is controlled in an air conditioner mode to form a refrigerant circulation loop constituted by the compressor 12, the refrigerant-cooling water heat exchanger 14, the outdoor heat exchanger 16, the air conditioner mode expansion valve 17 and the indoor heat exchanger 19. By way of this refrigerant circulation loop, cold air having a low temperature is generated in the indoor heat exchanger 19 to cool the passenger compartment.

During a passenger compartment heating mode, the heat pump side refrigerant circulation line 10 is controlled in a heat pump mode to form a refrigerant circulation loop constituted by the compressor 12, the refrigerant-cooling water heat exchanger 14, the heat pump mode expansion valve 15 and the outdoor heat exchanger 16. By way of this refrigerant circulation loop, heat having a high temperature is generated in the refrigerant-cooling water heat exchanger 14 and is transferred to the heater core side cooling water circulation line 20. Thus, the high-temperature heat transferred to a heater core side cooling water circulation line 20 is radiated into the passenger compartment through a heater core 22, thereby heating the passenger compartment.

The refrigerant-cooling water heat exchanger 14 includes a refrigerant flow path 14a through which the refrigerant in the heat pump side refrigerant circulation line 10 is circulated and a cooling water flow path 14b through which the cooling water in the heater core side cooling water circulation line 20 is circulated.

The refrigerant flow path 14a and the cooling water flow path 14b are formed to correspond to each other so that the refrigerant in the heat pump side refrigerant circulation line 10 and the cooling water in the heater core side cooling water circulation line 20 can exchange heat with each other.

Specifically, when the vehicle enters the heating mode while being controlled in a motor driven mode, the high-temperature refrigerant on the side of the refrigerant-cooling water heat exchanger 14 of the heat pump side refrigerant circulation line 10 and the cooling water in the heater core side cooling water circulation line 20 exchange heat with each other.

Accordingly, the heat of the refrigerant-cooling water heat exchanger 14 of the heat pump side refrigerant circulation line 10 is transferred to the cooling water in the heater core side cooling water circulation line 20. The cooling water heated by the heat is circulated through the heater core 22 to heat the passenger compartment.

On the other hand, the heater core side cooling water circulation line 20 connects the heater core 22, the refrigerant-cooling water heat exchanger 14 of the heat pump side refrigerant circulation line 10 and the engine 24 to each other. Specifically, the heater core side cooling water circulation line 20 connects the heater core 22, the refrigerant-cooling water heat exchanger 14 and the engine 24 in parallel with each other. The cooling water is circulated between the heater core 22, the refrigerant-cooling water heat exchanger 14 and the engine 24.

The heater core side cooling water circulation line 20 includes a flow control valve 26 for bringing the heater core 22 into communication with the engine 24 or bringing the heater core 22 into communication with the refrigerant-cooling water heat exchanger 14.

The flow control valve 26 is a three-way control valve and is installed at a branch point between the engine 24 and the refrigerant-cooling water heat exchanger 14, which are parallel-connected to the heater core 22.

Specifically, the flow control valve 26 is installed on the upstream side of the engine 24 and the refrigerant-cooling water heat exchanger 14 at a branch point between the engine 24 and the refrigerant-cooling water heat exchanger 14, which are parallel-connected to the heater core 22.

In the passenger compartment heating mode, the three-way flow control valve 26 brings the heater core 22 into communication with the engine 24 to form a cooling water circulation loop between the heater core 22 and the engine 24, or brings the heater core 22 into communication with the refrigerant-cooling water heat exchanger 14 to form a cooling water circulation loop between the heater core 22 and the refrigerant-cooling water heat exchanger 14.

Therefore, in the passenger compartment heating mode, the cooling water is circulated between the engine 24 and the heater core 22 to heat the passenger compartment with the waste heat of the engine 24, or the cooling water is circulated between the refrigerant-cooling water heat exchanger 14 and the heater core 22 to heat the passenger compartment with the heat generated in the refrigerant-cooling water heat exchanger 14.

Figure 3:
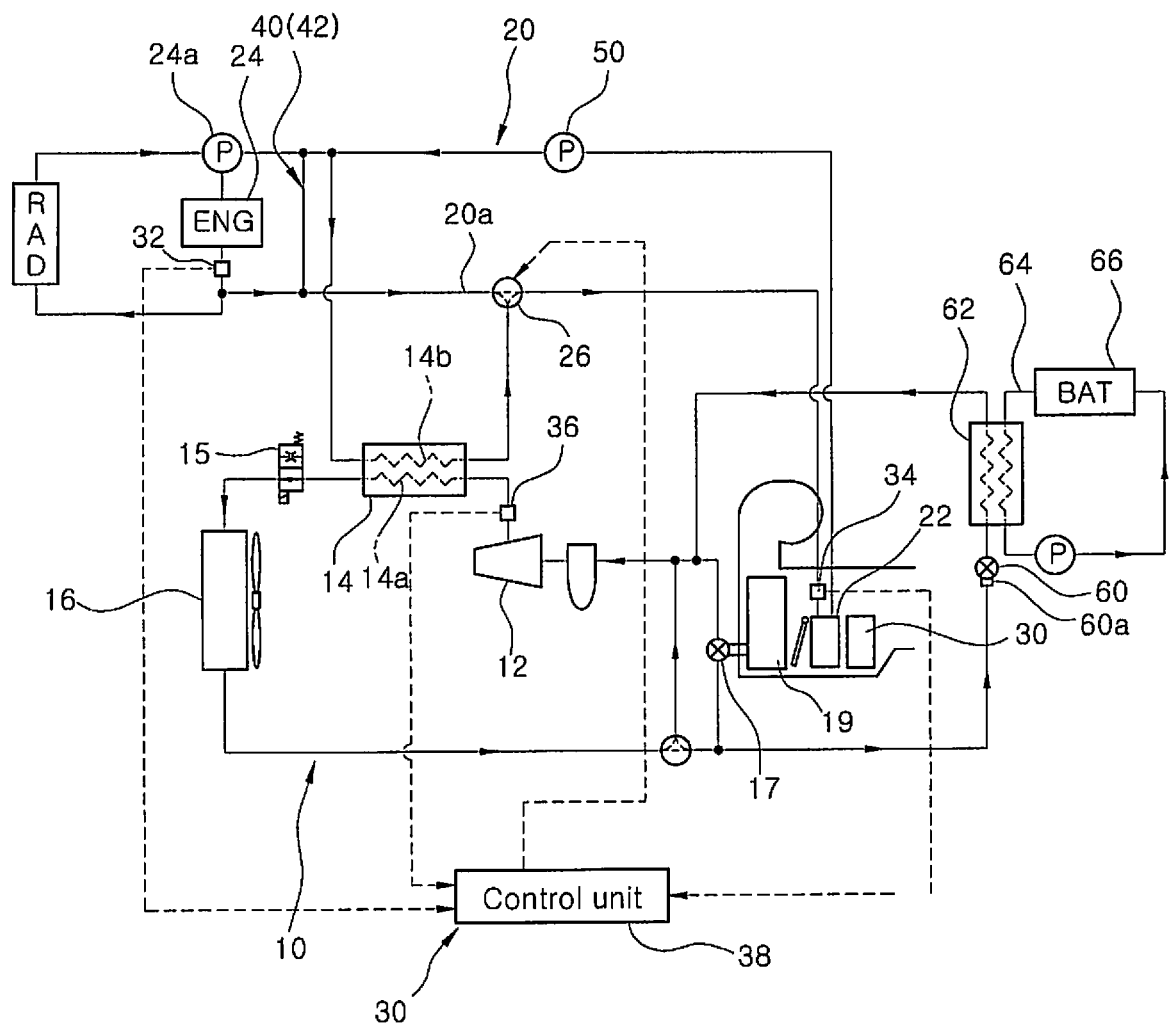
FIG. 3 is a view showing another installation example of a cooling water circulation line flow control valve which constitutes the vehicular heat management system according to the present invention.

As shown in FIG. 3, if necessary, the flow control valve 26 may be installed on the downstream side of the engine 24 and the refrigerant-cooling water heat exchanger 14 at a branch point between the engine 24 and the refrigerant-cooling water heat exchanger 14, which are parallel-connected to the heater core 22.

Referring again to FIG. 2, in the passenger compartment heating mode, the vehicular heat management system according to the present invention controls the flow control valve 26 of the heater core side cooling water circulation line 20 depending on the vehicle mode state, the engine cooling water temperature and the refrigerant temperature. The vehicular heat management system further includes a heat source selection unit 30 configured to, in the passenger compartment heating mode, select one of the engine 24 and the refrigerant-cooling water heat exchanger 14 as a passenger compartment heating heat source depending on the vehicle mode state, the engine cooling water temperature and the refrigerant temperature.

The heat source selection unit 30 includes an engine side cooling water temperature detection sensor 32 for detecting a cooling water temperature on the outlet side of the engine 24, a heater core side cooling water temperature detection sensor 34 for detecting a cooling water temperature on the inlet side of the heater core 22, a compressor side refrigerant temperature detection sensor 36 for detecting a refrigerant temperature on the outlet side of the compressor 12, and a control unit 38 for controlling the flow control valve 26 according to the temperature data inputted from the detection sensors 32, 34 and 36.

When the vehicle enters the engine driven mode during the passenger compartment heating mode, the control unit 38 compares the cooling water temperature on the outlet side of the engine 24 inputted from the engine side cooling water temperature detection sensor 32 with the cooling water temperature on the inlet side of the heater core 22 inputted from the heater core side cooling water temperature detection sensor 34.

If the result of comparison indicates that the cooling water temperature on the outlet side of the engine 24 exceeds the cooling water temperature on the inlet side of the heater core 22, the control unit 38 determines that the cooling water temperature of the engine 24 is high enough to be used as a passenger compartment heating heat source. When such determination is made, the control unit 38 enters a first heating mode to control the flow control valve 26 of the heater core side cooling water circulation line 20 so that the engine 24 and the heater core 22 are brought into communication with each other.

Thus, a cooling water circulation loop is formed between the heater core 22 and the engine 24. By way of the cooling water circulation loop thus formed, the waste heat of the engine 24 is transferred to the heater core 22 to heat the passenger compartment.

If the result of comparison indicates that the cooling water temperature on the outlet side of the engine 24 is equal to or lower than the cooling water temperature on the inlet side of the heater core 22, the control unit 38 determines that the cooling water temperature of the engine 24 is too low to be used as a passenger compartment heating heat source. When such determination is made, the control unit 38 enters a second heating mode to activate the heat pump side refrigerant circulation line 10 and controls the flow control valve 26 of the heater core side cooling water circulation line 20 to bring the refrigerant-cooling water heat exchanger 14 of the heat pump side refrigerant circulation line 10 into communication with the heater core 22.

Thus, a cooling water circulation loop is formed between the heater core 22 and the refrigerant-cooling water heat exchanger 14. By way of the cooling water circulation loop thus formed, the heat of the refrigerant-cooling water heat exchanger 14 of the heat pump side refrigerant circulation line 10 is transferred to the heater core 22 to heat the passenger compartment.

Referring again to FIG. 2, when the vehicle enters the motor driven mode during the passenger compartment heating mode, the control unit 38 compares the cooling water temperature on the outlet side of the engine 24 inputted from the engine side cooling water temperature detection sensor 32 with the refrigerant temperature on the outlet side of the compressor 12 inputted from the compressor side cooling water temperature detection sensor 36.

If the result of comparison indicates that the cooling water temperature on the outlet side of the engine 24 is lower than the refrigerant temperature on the outlet side of the compressor 12, the control unit 38 determines that the engine 24 is stopped so that the engine cooling water cannot be used as a passenger compartment heating heat source. When such determination is made, the control unit 38 enters a second heating mode to activate the heat pump side refrigerant circulation line 10 and controls the flow control valve 26 of the heater core side cooling water circulation line 20 to bring the refrigerant-cooling water heat exchanger 14 of the heat pump side refrigerant circulation line 10 into communication with the heater core 22.

Thus, a cooling water circulation loop is formed between the heater core 22 and the refrigerant-cooling water heat exchanger 14. By way of the cooling water circulation loop thus formed, the heat of the refrigerant-cooling water heat exchanger 14 of the heat pump side refrigerant circulation line 10 is transferred to the heater core 22 to heat the passenger compartment.

On the other hand, if the result of comparison indicates that the cooling water temperature on the outlet side of the engine 24 is equal to or higher than the refrigerant temperature on the outlet side of the compressor 12, the control unit 38 determines that the engine 24 is stopped but the engine cooling water temperature is still high due to the residual waste heat of the engine 24 and can be used as a passenger compartment heating heat source.

When such determination is made, the control unit 38 enters the first heating mode to control the flow control valve 26 of the heater core side cooling water circulation line 20 to bring the engine 24 into communication with the heater core 22.

Thus, a cooling water circulation loop composed of the heater core 22 and the engine 24 is formed. By way of the cooling water circulation loop thus formed, the residual waste heat of the engine 24 is transferred to the heater core 22 to heat the passenger compartment.

Referring again to FIG. 2, the vehicular heat management system according to the present invention further includes an engine cooling water independent circulation unit 40 configured to allow the cooling water of the engine 24 to circulate through an independent path regardless of the cooling water circulation loop formed between the refrigerant-cooling water heat exchanger 14 and the heater core 22 at the time of heating the passenger compartment with the heat of the refrigerant-cooling water heat exchanger 14.

The engine cooling water independent circulation unit 40 includes a bypass line 42 installed between the refrigerant-cooling water heat exchanger 14 and the engine 24 in the portions of the heater core side cooling water circulation line 20 between the heater core 22 and the engine 24 and between the refrigerant-cooling water heat exchanger 14 and the engine 24.

The bypass line 42 connects the outlet and the inlet of the engine 24 in the portions of the heater core side cooling water circulation line 20 between the refrigerant-cooling water heat exchanger 14 and the engine 24 which are connected in parallel.

Specifically, the bypass line 42 is connected at one end to the portion of the heater core side cooling water circulation line 20 between the outlet of the engine 24 and the branching point of the refrigerant-cooling water heat exchanger 14 and is connected at the other end to the portion of the heater core side cooling water circulation line 20 between the inlet of the engine 24 and the branching point of the refrigerant-cooling water heat exchanger 14.

The bypass line 42 makes it possible to form a cooling water circulation loop between the engine 24 and the bypass line 42. Specifically, a separate cooling water circulation loop is formed between the engine 24 and the bypass line 42 regardless of the cooling water circulation loop formed between the heater core 22 and the refrigerant-cooling water heat exchanger 14.

Figure 4:
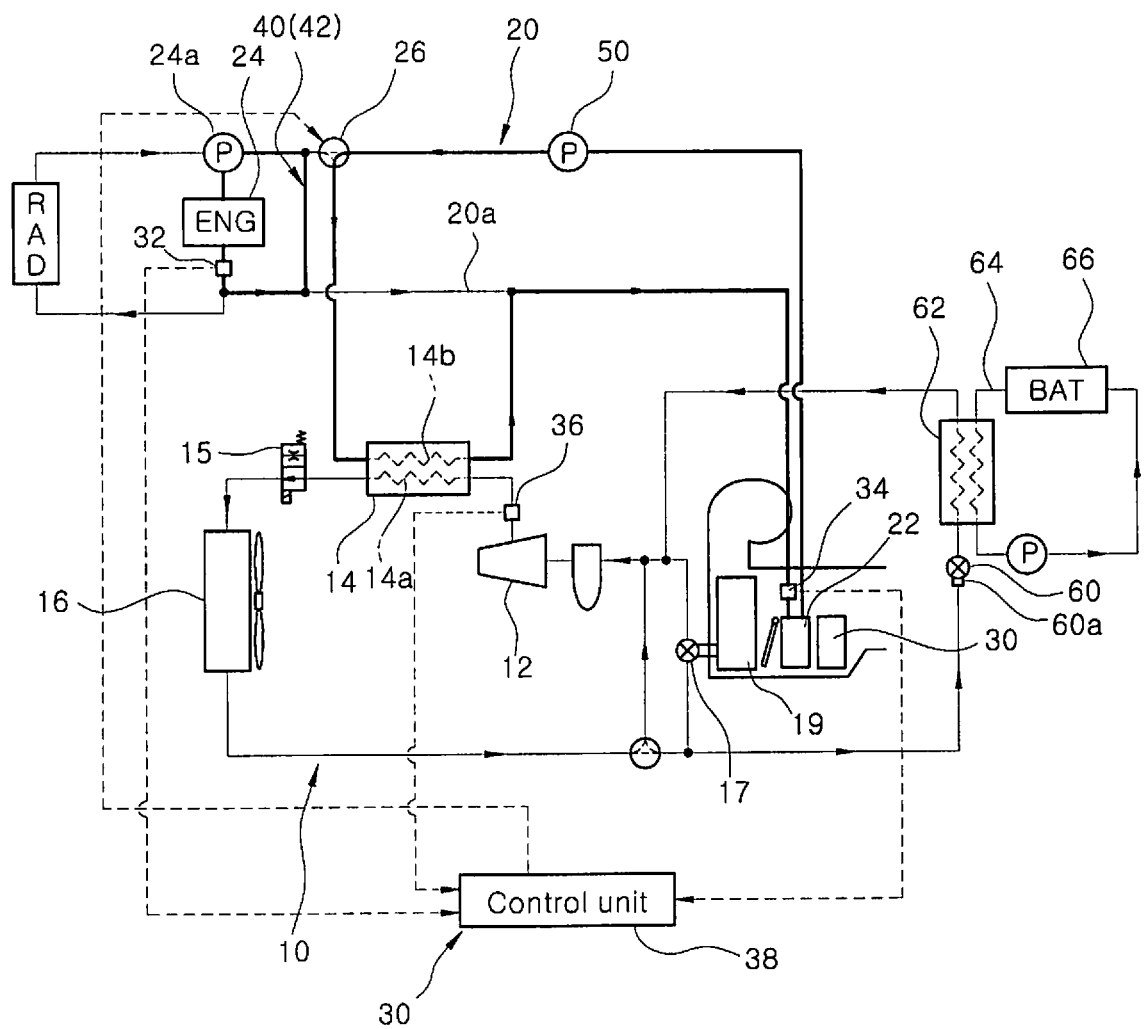
FIG. 4 is a view showing an operation example of the vehicular heat management system according to the present invention, wherein a passenger compartment is heated using the heat of a heat pump.

Therefore, as shown in FIG. 4, when the passenger compartment is heated through the cooling water circulation loop formed between the heater core 22 and the refrigerant-cooling water heat exchanger 14, the cooling water can independently circulate between the engine 24 and the bypass line 42.

Specifically, when the engine 24 is operated in a state in which the passenger compartment is heated through the cooling water circulation loop between the heater core 22 and the refrigerant-cooling water heat exchanger 14, the cooling water of the engine 24 can independently circulate through the cooling water circulation loop between the engine 24 and the bypass line 42 regardless of the cooling water circulation loop between the heater core 22 and the refrigerant-cooling water heat exchanger 14.

As a result, the heating of the passenger compartment using the heat of the refrigerant-cooling water heat exchanger 14 of the heat pump side refrigerant circulation line 10 and the operation of the engine 24 can be performed independently.

Specifically, when the engine cooling water temperature is low despite the operation of the engine 24 so that the engine cooling water cannot be used as a passenger compartment heating heat source, the operation of the engine 24 and the heating of the passenger compartment using the heat of the refrigerant-cooling water heat exchanger 14 are performed at the same time. In this case, the operation of the engine 24 can be independently performed regardless of the heating of the passenger compartment using the heat of the refrigerant-cooling water heat exchanger 14. Hereinafter, the mode in which the heating of the passenger compartment using the heat of the refrigerant-cooling water heat exchanger 14 and the operation of the engine 24 are performed independently will be referred to as "third heating mode".

In addition, the bypass line 42 is installed between the engine 24 and the heater core 22. Thus, the cooling water circulation loop formed between the bypass line 42 and the engine 24 is included in the cooling water circulation loop formed between the engine 24 and the heater core 22.

Figure 5:
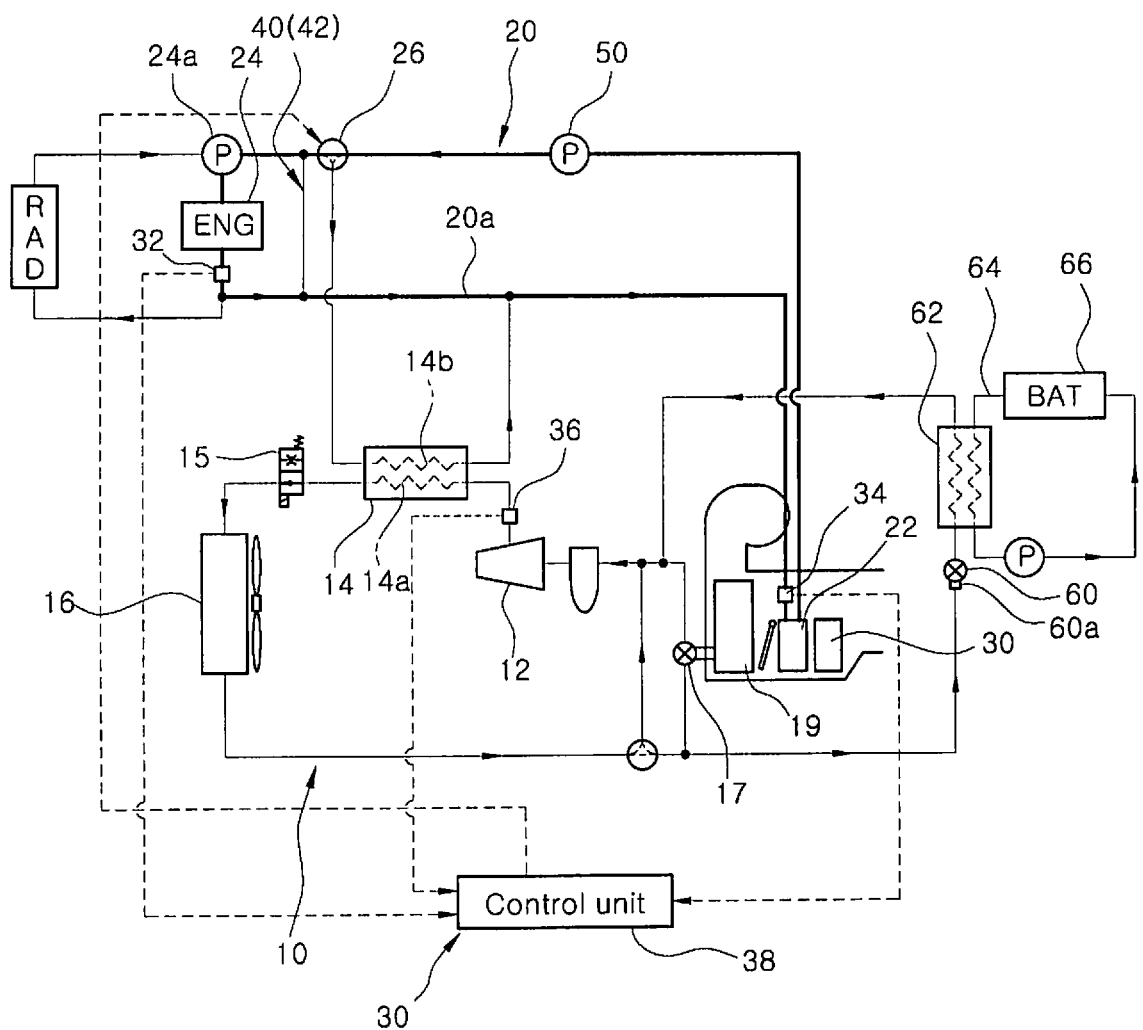
FIG. 5 is a view showing an operation example of the vehicular heat management system according to the present invention, wherein a passenger compartment is heated using the waste heat of an engine.
Figure 6:
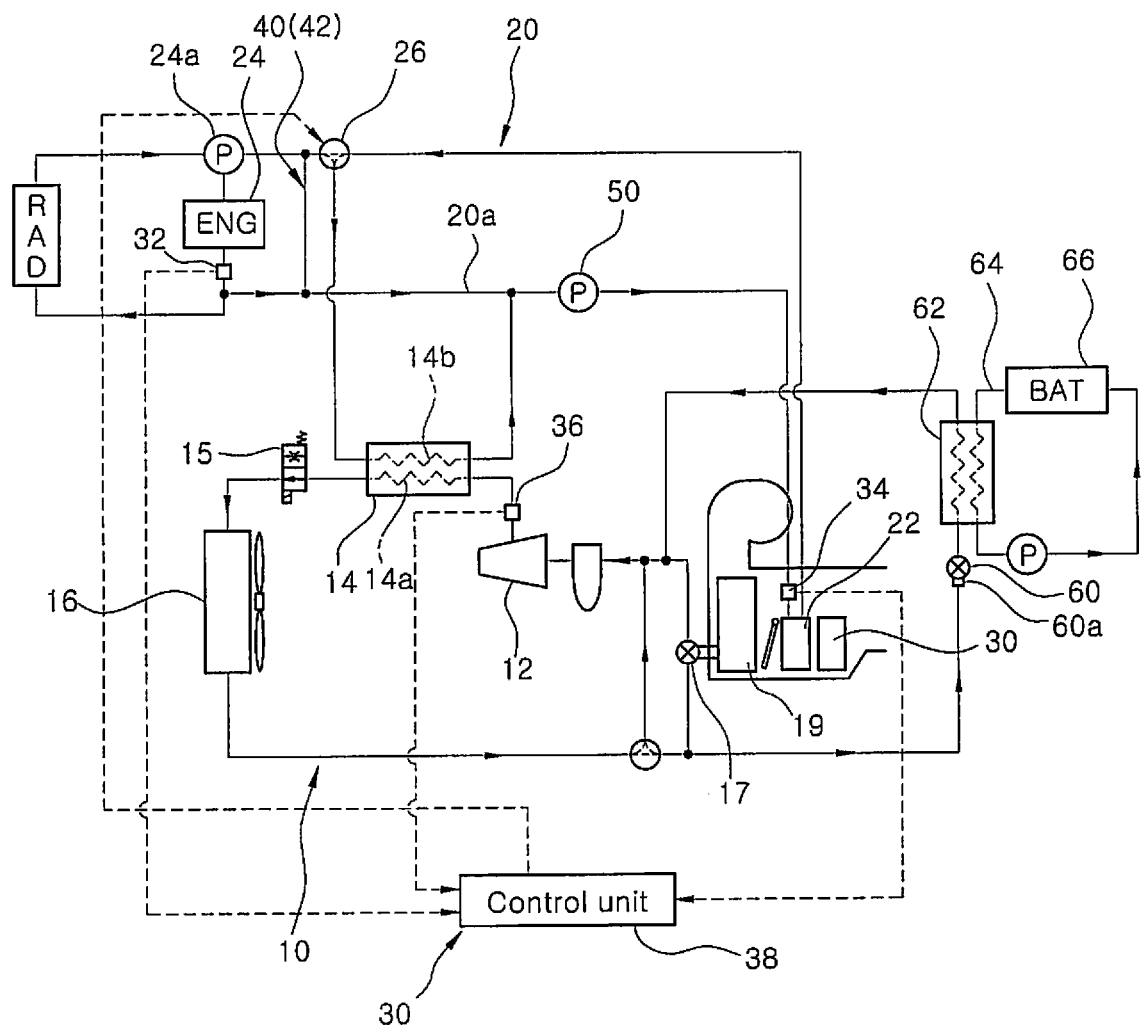
FIG. 6 is a view showing another installation example of a cooling water circulation line electric water pump which constitutes the vehicular heat management system according to the present invention.

Therefore, as shown in FIG. 5, the cooling water existing between the bypass line 42 and the engine 24 is included in the cooling water circulation loop between the engine 24 and the heater core 22.

As a result, when the cooling water temperature of the engine 24 is increased to such a level that the cooling water of the engine 24 can be used as a passenger compartment heating heat source, and when the passenger compartment heating heat source is switched to the waste heat of the engine 24, the high-temperature engine cooling water circulating between the engine 24 and the bypass line 42 is included in the cooling water circulation loop between the engine 24 and the heater core 22.

Accordingly, it is possible to effectively increase the temperature of the cooling water circulating along the cooling water circulation loop between the engine 24 and the heater core 22. As a result, it is possible to enhance the passenger compartment heating efficiency.

The bypass line 42 is configured to have a smaller diameter than the cooling water line 20a that constitutes the cooling water circulation loop between the engine 24 and the heater core 22.

This is to make sure that the bypass line 42 has a larger cooling water circulation resistance than the cooling water circulation loop side cooling water line 20a between the engine 24 and the heater core 22.

When the passenger compartment heating heat source is switched to the waste heat of the engine 24, the cooling water of the engine 24 circulates along the cooling water circulation loop between the engine 24 and the heater core 22. At this time, the cooling water of the engine 24 is not introduced into the bypass line 42 having a relatively high circulation resistance.

Referring again to FIG. 2, the vehicular heat management system according to the present invention further includes an electric water pump 50 installed in the heater core side cooling water circulation line 20.

The electric water pump 50 is installed in the portion of the heater core side cooling water circulation line 20 between the heater core 22, the refrigerant-cooling water heat exchanger 14 and the engine 24.

Specifically, the electric water pump 50 is installed in the portion of the heater core side cooling water circulation line 20 between the heater core 22, the refrigerant-cooling water heat exchanger 14 and the engine 24 at a position at which the electric water pump 50 can circulate both the cooling water of the cooling water circulation loop for transferring the heat of the refrigerant-cooling water heat exchanger 14 to the heater core 22 and the cooling water of the cooling water circulation loop for transferring the waste heat of the engine 24 to the heater core 22.

For example, the electric water pump 50 is installed in the portion where the cooling water circulation loop for transferring the heat of the refrigerant-cooling water heat exchanger 14 to the heater core 22 and the cooling water circulation loop for transferring the waste heat of the engine 24 to the heater core 22 overlap with each other, namely in one of the portions between the branching points of the heater core 22 and the refrigerant-cooling water heat exchanger 14.

Since the electric water pump 50 is installed between the branching points of the heater core 22 and the refrigerant-cooling water heat exchanger 14, it is possible for the electric water pump 50 to circulate the cooling water of the cooling water circulation loop between the heater core 22 and the refrigerant-cooling water heat exchanger 14 as shown in FIG. 4 and to circulate the cooling water of the cooling water circulation loop between the heater core 22 and the engine 24 as shown in FIG. 5.

Accordingly, as shown in FIG. 4, even when the passenger compartment is heated by the heat of the refrigerant-cooling water heat exchanger 14, it is possible to circulate the cooling water in the heater core side cooling water circulation line 20. Furthermore, as shown in FIG. 5, even when the passenger compartment is heated by the waste heat of the engine 24, it is possible to circulate the cooling water in the heater core side cooling water circulation line 20.

Specifically, when the engine 24 is stopped, a mechanical water pump 24a installed in the engine 24 is also turned off. Even if the mechanical water pump 24a is turned off in this way, when the passenger compartment is heated by the residual waste heat of the engine 24, it is possible to smoothly circulate the cooling water of the engine 24 toward the heater core 22.

Referring again to FIG. 2, the vehicular heat management system according to the present invention further includes a battery cooling mode expansion valve 60 installed on the heat pump side refrigerant circulation line 10 in parallel with the air conditioner mode expansion valve 17, and a chiller 62 installed on the downstream side of the battery cooling mode expansion valve 60.

In a passenger compartment cooling mode, the battery cooling mode expansion valve 60 introduces, expands and depressurizes the refrigerant existing on the side of the outdoor heat exchanger 16 of the heat pump side refrigerant circulation line 10.

The chiller 62 generates cold energy by introducing the depressurized/expanded refrigerant and transfers the cold energy to a battery side refrigerant circulation line 64, thereby cooling a battery 66 on the battery side refrigerant circulation line 64.

The battery cooling mode expansion valve 60 is a mechanical valve whose opening degree is automatically controlled according to the temperature of the refrigerant and is an integrated valve integrally provided with an externally-controlled on/off valve 60a.

The battery cooling mode expansion valve 60 integrally provided with the externally-controlled on/off valve is turned on or off in response to a control signal inputted from the outside to perform or stop a refrigerant expansion/depressurization action. Thus, the generation of cold energy in the chiller 62 is performed or stopped to perform or stop the cooling of the battery 66. As a result, the chiller 62 may be selectively operated only when it is necessary to cool the battery 66.

On the other hand, the air conditioner mode expansion valve 17 of the refrigerant circulation line 10 is a mechanical valve whose opening degree is automatically controlled according to the temperature of the refrigerant. More specifically, the air conditioner mode expansion valve 17 is an internally controlled valve whose opening degree is automatically controlled according to the temperature of the refrigerant on the outlet side of the indoor heat exchanger 19.

Since the opening degree of the internally controlled air conditioner mode expansion valve 17 is automatically controlled according to the temperature of the refrigerant on the outlet side of the indoor heat exchanger 19, it is possible to automatically control the cooling performance of the indoor heat exchanger 19 according to the thermal load, i.e., the cooling/heating load of the indoor heat exchanger 19.

According to the vehicular heat management system of the present invention, in the passenger compartment heating mode, the waste heat of the engine 24 and the heat of the heat pump side refrigerant circulation line 10 are used as passenger compartment heating heat sources. One of the waste heat of the engine 24 and the heat of the heat pump side refrigerant circulation line 10 is selected and used as a passenger compartment heating heat source depending on the mode state and the heating mode of the vehicle. Accordingly, it is possible to minimize the energy consumption and enhance the passenger compartment heating efficiency.

Particularly, one of the waste heat of the engine 24 and the heat of the heat pump side refrigerant circulation line 10, whichever is higher in thermal efficiency, is preferentially used as a heat source as long as it does not deteriorate the passenger compartment heating effect. Therefore, it is possible to enhance the passenger compartment heating efficiency while minimizing the energy consumption.

In addition, since the passenger compartment heating efficiency can be enhanced while minimizing the energy consumption, it is possible to improve the fuel efficiency of the vehicle and improve the comfort in the passenger compartment.

While a preferred embodiment of the present invention has been described above, the present invention is not limited to the above-described embodiment. Various modifications and changes may be made without departing from the scope and spirit of the present invention defined in the claims.

What is claimed is:

1. A vehicular heat management apparatus, comprising:
a refrigerant circulation line configured to cool or heat a passenger compartment by generating hot air or cold air depending on a flow direction of a refrigerant;
a cooling water circulation line configured to heat the passenger compartment with waste heat of an engine by allowing cooling water of the engine to circulate through a heater core;
and a bypass line configured to allow the cooling water on an outlet side of the engine to flow toward an inlet side of the engine; and
the bypass line is configured to connect the outlet side and the inlet side of the engine in a portion of the cooling water circulation line between a refrigerant-cooling water heat exchanger and the engine, and
wherein the bypass line is connected at one end to a portion of the cooling water circulation line between the outlet of the engine and a branching point of the refrigerant-cooling water heat exchanger and connected at the other end to a portion of the cooling water circulation line between the inlet of the engine and the branching point of the refrigerant-cooling water heat exchanger to form a first cooling water circulation loop for allowing the cooling water on the outlet side of the engine to directly circulate toward the inlet side of the engine, and
wherein the bypass line has a smaller diameter than a cooling water circulation line that constitutes the first cooling water circulation loop between the engine and the heater core, and
wherein the cooling water of the engine is not introduced into the bypass line having a relatively high circulation resistance, when the passenger compartment heating heat source is switched to the waste heat of the engine, and the cooling water of the engine circulates along the first cooling water circulation loop between the engine and the heater core, and
wherein the refrigerant-cooling water heat exchanger and the engine are parallel-connected to the heater core, and
wherein the refrigerant circulation line includes a compressor, a refrigerant-cooling water heat exchanger, a heat pump mode expansion valve, an outdoor heat exchanger, an air conditioner mode expansion valve and an indoor heat exchanger, and
wherein the cooling water circulation line connects the heater core, the refrigerant-cooling water heat exchanger of the heat pump side refrigerant circulation line and the engine to each other, and
wherein the refrigerant-cooling water heat exchanger includes a refrigerant flow path through which the refrigerant in the heat pump side refrigerant circulation line is circulated and a cooling water flow path through which the cooling water in the heater core side cooling water circulation line is circulated, and
wherein the apparatus, selects one of the engine and the refrigerant-cooling water heat exchanger as a passenger compartment heating heat source depending on the vehicle mode state, the engine cooling water temperature and the refrigerant temperature, in the passenger compartment heating mode, and
wherein the apparatus includes an engine side cooling water temperature detection sensor, a heater core side cooling water temperature detection sensor and a compressor side refrigerant temperature detection sensor, and
wherein one of a first heating mode, a second heating mode and a third heating mode is selected and used depending on a cooling water temperature on the side of the engine, a cooling water temperature on the side of the heater core and a refrigerant temperature on the side of the refrigerant-cooling water heat exchanger, and
wherein a first cooling water in the cooling water circulation line is caused to circulate between the engine and the heater core during the first heating mode, the cooling water in a second cooling water circulation line is caused to circulate between the refrigerant-cooling water heat exchanger and the heater core during the second heating mode, and the cooling water passed through the engine is caused to bypass the heater core and recirculate to the engine while allowing the cooling water in the cooling water circulation line to circulate between the refrigerant-cooling water heat exchanger and the heater core during the third heating mode, and
wherein a separate cooling water circulation loop of the third heating mode is formed between the engine and the bypass line regardless of a second cooling water circulation loop formed between the heater core and the refrigerant-cooling water heat exchanger, so that the engine cooling water cannot be used as a passenger compartment heating heat source, and
wherein a third cooling water circulation loop formed between the engine and the bypass line is included in the first cooling water circulation loop formed between the engine and the heater core, and
wherein when the cooling water temperature of the engine is increased to such a level that the cooling water of the engine can be used as a passenger compartment heating heat source, and when the passenger compartment heating heat source is switched to the waste heat of the engine, the high-temperature engine cooling water circulating between the engine and the bypass line is included in the first cooling water circulation loop between the engine and the heater core.

2. The apparatus of claim 1, further comprising:
a flow control valve configured to control a flow direction of the cooling water in the cooling water circulation line so that the cooling water circulates between the engine and the heater core to transfer the waste heat of the engine to the heater core or so that the cooling water circulates between the refrigerant-cooling water heat exchanger and the heater core to transfer the heat of the refrigerant circulation line to the heater core,
wherein the flow control valve is installed at a branching point of the engine and the refrigerant-cooling water heat exchanger which are parallel-connected to the heater core.

3. The apparatus of claim 2, wherein the flow control valve is installed at the branching point of the engine and the refrigerant-cooling water heat exchanger on an upstream side of the engine and the refrigerant-cooling water heat exchanger.

4. The apparatus of claim 2, wherein the flow control valve is installed at the branching point of the engine and the refrigerant-cooling water heat exchanger on a downstream side of the engine and the refrigerant-cooling water heat exchanger.

5. The apparatus of claim 1, wherein the engine side cooling water temperature detection sensor is installed on an outlet side of the engine so as to detect a cooling water temperature on the outlet side of the engine, the heater core side cooling water temperature detection sensor is installed on an inlet side of the heater core so as to detect a cooling water temperature on the inlet side of the heater core, and the compressor side refrigerant temperature detection sensor is installed on an outlet side of the compressor so as to detect a refrigerant temperature on the outlet side of the compressor.

6. The apparatus of claim 1, further comprising:
an electric water pump installed on the cooling water circulation line,
wherein the electric water pump is installed in a portion of a second cooling water circulation line at a position at which the electric water pump can circulate both the cooling water in a cooling water circulation loop for transferring the heat of the refrigerant-cooling water heat exchanger to the heater core and the cooling water in the first cooling water circulation loop for transferring the waste heat of the engine to the heater core.

7. The apparatus of claim 6, wherein the electric water pump is installed in a portion of the second cooling water circulation line where the second cooling water circulation loop for transferring the heat of the refrigerant-cooling water heat exchanger to the heater core and the first cooling water circulation loop for transferring the waste heat of the engine to the heater core overlap with each other.

8. The apparatus of claim 1, wherein the cooling water circulation line further includes an air conditioner mode expansion valve configured to depressurize and expand the refrigerant and feed the refrigerant to an indoor heat exchanger in a passenger compartment cooling mode and a battery cooling mode expansion valve configured to depressurize and expand the refrigerant and feed the refrigerant to a battery cooling chiller in a battery cooling mode,
the air conditioner mode expansion valve is an internally controlled valve whose opening degree is automatically controlled according to a refrigerant temperature which fluctuates depending on a cooling/heating load, and
the battery cooling mode expansion valve is an integrated valve integrally provided with an externally controlled on/off valve for performing or stopping a refrigerant expansion/depressurization action while being turned on or off in response to a control signal inputted from the outside.

\* \* \* \* \*